United States Patent Office 3,425,262
Patented Feb. 4, 1969

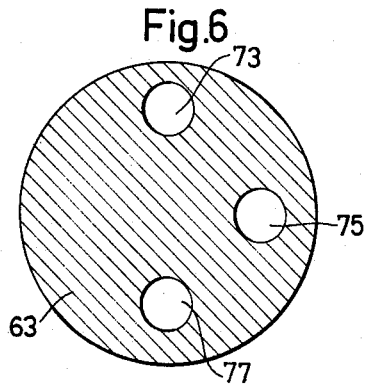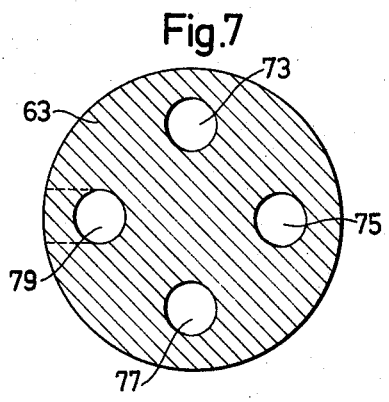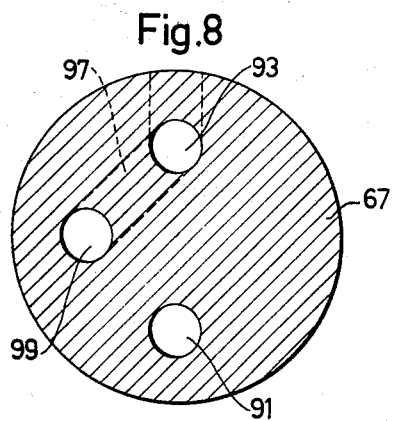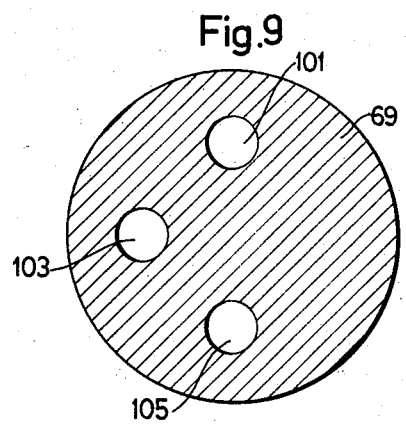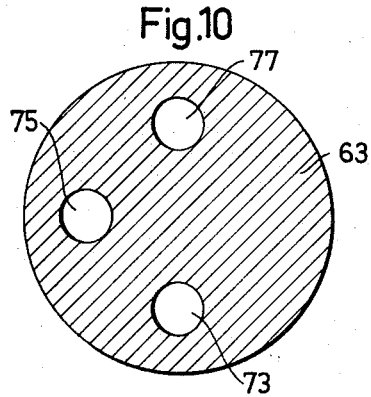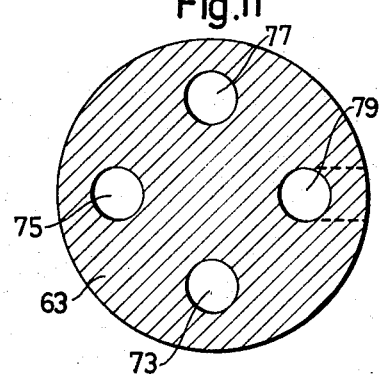

3,425,262
DEVICE FOR CALIBRATING FLOWMETERS
Paul Herzog, Solna, Sweden, assignor to Elektromedizin und Respirator AG, Zug, Switzerland, a corporation of Switzerland
Filed Oct. 13, 1966, Ser. No. 586,438
Claims priority, application Sweden, Oct. 22, 1965, 13,712/65; July 8, 1966, 9,424/66
U.S. Cl. 73—3　　　　　　　　　　　　　4 Claims
Int. Cl. G01l 25/00

ABSTRACT OF THE DISCLOSURE

An apparatus for calibrating a pneumotachograph in which the flow meter to be calibrated is combined with the calibrating mechanism. A sliding rotating valve assembly allows the meter to be connected in either a calibrating or a measuring mode. A known but variable flow is produced by a piston-cylinder arrangement.

---

The present invention relates to a method and a device for calibrating flow meters, for instance pneumotachographs for observing the respiration process when using respirators or in spontaneous breathing.

Flow meters of different kinds for measuring the flow rate of a medium in liquid or gaseous form very often have the property of registering a value which is dependent on the viscosity of the flowing medium and which of course can also be dependent on other parameters, such as pressure, temperature etc. This fact means that, for instance when changing the viscosity of the medium, the flow rate of which is to be measured, it is necessary to recalibrate the flow meter in conformity with the new viscosity. This is a timewasting procedure if it is to be carried out according to methods known per se and requires that the flow meter must be removed from the flow system for calibration. It is, of course, also possible to calibrate the flow meter where it is positioned, but in that case the normal function of the system must be interrupted during calibration, which is timewasting and expensive.

The main object of the present invention is to provide a method and a device by means of which an accurate calibration of flow meters can be carried out in a fast and simple manner.

Another object of the invention is to provide a device particularly useful in breathing apparatus, such as respirators and the like, by which the calibration of the flow meter can be carried out without interrupting the normal flow required for the breathing.

The method of the invention resides in the fact that a fluid flow is generated by means of a piston pump, the piston of which is moved in a predetermined way with a velocity continuously variable from zero to a maximum value, which fluid flow is led through the flow meter, the response of which is registered and correlated with the corresponding values of the flow rate of the fluid determined by the movement of the piston.

In a preferred embodiment of the method of the invention—the flowmeter being a so-called pneumotachograph the response of which is based on differential pressure—the response of the flowmeter is transferred to an electric differential pressure meter the electric signal of which is continuously registered on a recorder.

By the method of the invention it is thus possible in a few seconds to calibrate a flowmeter over its whole measuring range continuously from zero to a maximum value.

The device of the invention includes a piston pump, the piston of which is arranged to move in a predetermined manner with a velocity continuously variable from zero to a maximum value, and the working end of which is connected to the flowmeter. The piston can be connected to a crank shaft, which is arranged to impart an essentially sine-shaped movement to the piston.

In a preferred embodiment of the invention the device includes an articulated connecting rod (or, distance piece) for connecting the piston with the crank shaft and having a length of twice the radius of the crank shaft. The device may be provided with a reservoir, for instance a rubber bladder, connected to the flowmeter opposite to the working end of the piston pump, a closed volume for the calibrating fluid thus being obtained.

According to another aspect of the invention, the flowmeter in question is arranged to be calibrated in a calibrating circuit with a calibrating medium having a known flow rate and the flowmeter is shiftable between a measuring position in a measuring circuit and a calibrating position in the calibrating circuit, conduits being provided to transfer medium to the calibrating circuit for filling same with medium of current interest before the calibration, the flowmeter being in measuring position. According to a particular feature of the invention a connecting conduit is provided by which the flow of the medium can be maintained during calibration with the flowmeter being in calibrating position. This feature of the invention is, of course, of a great importance in breathing apparatus, where for obvious reasons it is not possible to interrupt the supply of respiration gas during calibration.

The invention will now be described by non-limiting examples with reference to the appended drawings, in which:

FIG. 6 shows diagrammatically a section through the valve slide taken along the line III—III in FIG. 4.

FIG. 7 shows diagrammatically a section through the valve slide taken along the line IV——IV in FIG. 4.

FIG. 8 shows diagrammatically a section through one end piece taken along the line V—V in FIG. 4.

FIG. 9 shows diagrammatically a section through the other end piece taken along the line VI—VI in FIG. 4.

FIG. 10 shows diagrammatically a section through the valve slide taken along the line VII—VII in FIG. 5.

FIG. 11 shows diagrammatically a section through the valve slide taken along the line VIII—VIII in FIG. 5.

Figure 1:
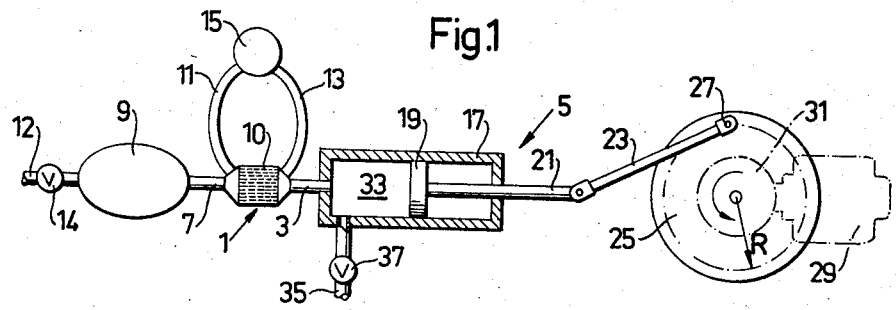
FIG. 1 shows diagrammatically a preferred embodiment of the device of the present invention.

Generally, the apparatus of FIG. 1 comprises a flowmeter 1, a so-called pneumotachograph, one side 3 of which is connected to the working end of a piston pump generally indicated at 5, and the other side 7 of which is connected to a rubber bladder 9. A pneumotachograph is a flowmeter, in which the flowing gaseous medium flows through longitudinal channels 10, in which the flow is laminar. The recording of the flow rate is based on measuring the pressure drop over the channels 10. In the present example the pressure signal is transferred by two conduits 11, 13 to an electric pressure differential meter 15, the electric signal of which is continuously recorded on a recorder (not shown).

The piston pump 5 comprises a pump cylinder 17 having a piston 19 and a piston rod 21, which latter is led through the end of the cylinder 17 opposite to the pneumotachograph 1. At its outer end the piston rod 21 is pivotally connected to a crank shaft or distance piece 23, which latter in turn is pivotally connected to a crank pin 27 mounted on a crank wheel 25. The crank wheel 25 can be rotated at a constant speed by means of a synchronous motor 29, the output speed of which is reduced by means of a worm gear 31 connected to the crank wheel 25. (Motor 29 and gear 31 are diagrammatically indicated with dashed lines.) In the embodiment shown, the length of the connecting rod or distance piece 23 is twice the crank radius R.

The working space of the piston pump is the space to the left of the piston 19 and is indicated at 33 in FIG. 1. Said space is thus connected to the pneumotachograph 1 and is furthermore openable to the atmosphere through a conduit 35 containing a valve 37. The bladder 9 has a connection 12 with a valve 14 for a purpose to be described below.

The function of the apparatus of FIG. 1 is now more closely described in connection with the diagram of FIG. 2.

Assume that the pneumotachograph 1 is to be calibrated for a certain medium, for instance a gas for a respiration purpose. The respiration gas is supplied to the calibration space of the apparatus through the connection 12, valves 14 and 37 being in the open position. The calibration space includes the bladder 9 and the working space 33 of the cylinder 17 and connecting conduits therefor including the pneumotachograph 1. The calibrating space is filled to such an extent that bladder 9 is merely partly filled and remains slack. After the filling of gas, valves 14 and 37 are closed and the synchronous motor 29 is activated.

Figure 2:
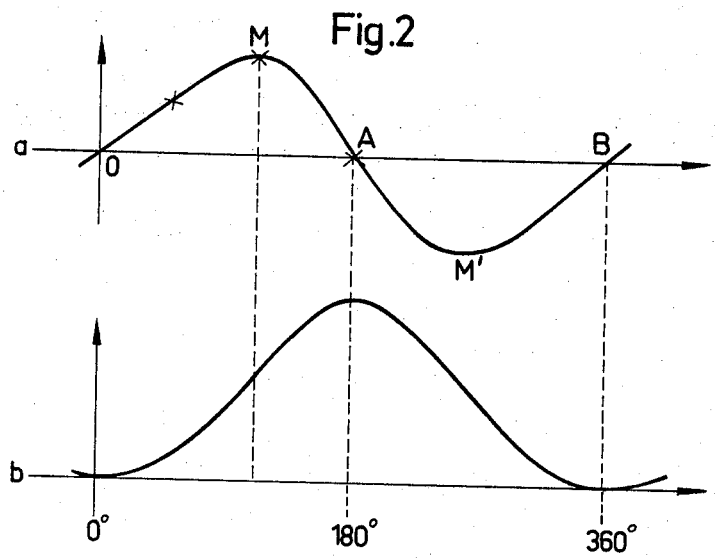
FIG. 2 shows a diagram of the flow and the volume as a function of the movement of the piston pump of FIG. 1.

The motor 29 imparts a constant rotational speed to the crank wheel 25, for instance 60 revolutions per minute, a movement corresponding to the curve in FIG. 2a being imparted to the piston 19. Considering the right end position of the piston in the cylinder in FIG. 1 corresponding to origin 0 in FIG. 2 and indicated 0°, the piston in this moment has a velocity of 0. As it moves to the left as seen in FIG. 1 its velocity increases and reaches a maximum at point M in FIG. 2a. This point essentially corresponds to the position of the piston shown in FIG. 1. Then the velocity decreases and has a value of 0 at point A in FIG. 2a corresponding to the left end position of the piston as seen in FIG. 1. The crank wheel 25 has turned half a turn or 180° from the starting position. At continued movement of the crank wheel 25 the piston 19 moves with an increasing velocity but in the opposite direction passing a velocity maximum (point M′ in FIG. 2a) and then with a velocity decreasing to zero back to the starting position (point B in FIG. 2a), the crank wheel having moved one complete turn or 360°.

Knowing the rotational speed of the crank shaft 25 and the stroke and diameter of the piston, the flow rate of the gas passing the pneumotachograph 1 is easily calculated for any position of the piston 19. Said data are then plotted on the coordinates of the curve corresponding to that of FIG. 2 and being drawn by the recorder based on the signals from the electric pressure differential meter 15. In this way a quick and accurate calibration of the pneumotachograph is obtained for the gas mixture in question over the whole measuring range from 0 to a maximum value at M and M′, respectively, and in both flow directions. In view of the slack condition of the bladder 9 said bladder can easily absorb the volume changes caused by the movement of the piston 19 so that the pressure in the calibrating space remains essentially constant during the course of calibration.

The advantage of using a connecting rod or distance piece having a length of 2R lies in the fact that the calculation of the diagram over the flow in FIG. 2a is significantly simplified. It is of course possible to use any length. Nor is it necessary to impart a circular movement to the outer end of the distance piece, as in the present example. The crank wheel 25 may be provided with a guide track of any shape, in which a guide pin arranged on the outer end of the distance piece engages. In this way any shape of curve for the course of flow can be obtained.

FIG. 2b shows the curve of the volume change caused by the movement of the piston 19. The curve is obtained by integration of the flow curve in FIG. 2a and thus has a maximum at 180° (point A in FIG. 2a). The recorder for registering the pressure drop over the pneumotachograph 1 can be provided with a device for electrically integrating the registered flow curve, a volume curve corresponding to that of FIG. 2b being directly obtained on the recorder.

Figure 3:
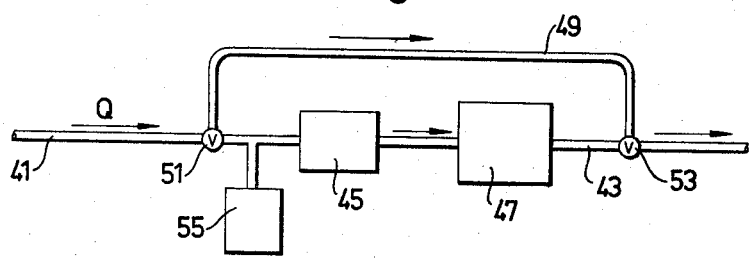
FIG. 3 shows a flow sheet of a suggested system in which the device of the invention is used.

FIG. 3 shows diagrammatically by means of a flow sheet a suggested system in which the device of the invention can be used. A flow Q of a medium, for instance a gas, being supplied to a reaction zone in a predetermined amount per unit of time flows through a conduit 41, 43, containing a flowmeter 45 and a reservoir 47 corresponding to the bladder 9 of FIG. 1. A by-pass conduit 49 is connected to the conduit 41, 43 on opposite sides of the meter 45 and reservoir 47 by means of two three-way valves 51, 53. A piston pump 55 is connected to the conduit 41 between one three-way valve 51 and the flowmeter 45.

Now assume that the reaction conditions are to be changed and thereby also the composition of the gas Q, the viscosity thereof being changed. This means that the reading of the flowmeter is no longer accurate, as the meter had been calibrated for a gas of another viscosity. The flowmeter will thus have to be recalibrated with respect to the gas mixture in question. This recalibration is carried out by by-passing the system 55, 45, 47, by simultaneous shifting of three-way valves 51, 53 so as to by-pass the flow through the by-pass conduit 49. In this way a seperate calibrating space containing the gas mixture in question is estabilshed, a fast calibration of the flowmeter 45 being carried out by actuating the piston pump 55. After this operation—which in view of the present invention can be carried out in a few seconds— the initital flow path is restored by shifting the three-way valves 51, 53, the flow Q again being registered.

Figure 4:
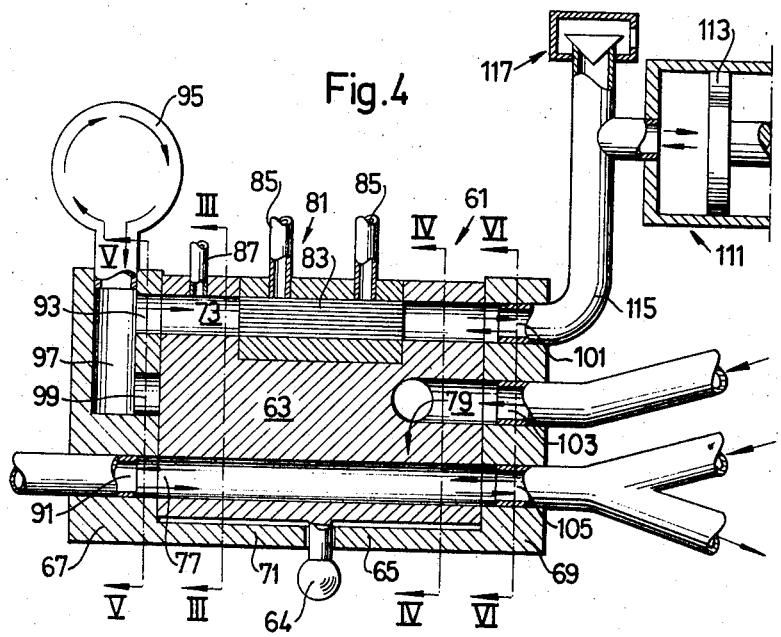
FIG. 4 shows diagrammatically and partly in section an embodiment of a change-over valve of the invention with the flowmeter being in calibrating position.

Referring to FIGS. 4–11, the device shown can be regarded as being a change-over valve for changing over the flowmeter from measuring position to calibrating position, thus replacing valves 51 and 53 in FIG. 4. The device, which is assumed to be used in connection with a respirator, comprises a valve unit, generally designated 61, having a valve slide 63, which is arranged rotatably in a valve housing 65 consisting of end pieces 67 and an intermediate piece 71. The valve slide 63, in the present embodiment having the form of a cylindric body, contains three axial through channels 73, 75, 77 arranged at equal radial distances from the centre axis of the valve slide and being displaced by 90°, and an end channel 79 at one end opening at the right end (as seen in FIG. 4) of the valve slide 63 and at the other end opening at the envelope surface of the valve slide at a distance from the end thereof. The end channel 79 is diametrically opposite to the channel 75.

Figure 5:
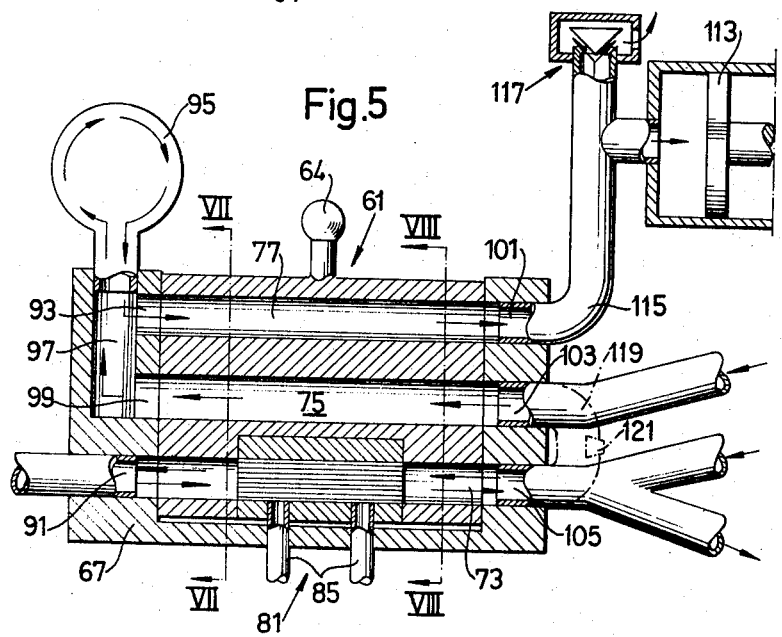
FIG. 5 shows diagrammatically a section similar to that of FIG. 4 but with the flowmeter in measuring position.

In the channel 73 there is arranged a flowmeter, generally designated 81—which in the present case consists of a so-called pneumotachograph—wherein the flow of gaseous medium goes through longitudinally extending channels 83, in which the flow is laminar. The recording of the flow is based on measuring the pressure drop over the channels 83. FIGS. 4 and 5 show diagrammatically pressure connections 85 on the flowmeter for registering the pressure difference, and the recording can be carried out with an electric pressure differential meter with continuous recording of the electric signal thereof. FIG. 4 also shows a pressure connection 87 for determining the absolute pressure in the channel 73. For the sake of simplicity the channel 73 is called flow measuring channel, channel 75 transferring channel and channel 77 connecting channel.

By adjusting the angular position of the valve slide the different channels therein can be connected with corresponding openings or passages in the end pieces 67, 69 of the valve housing 65. Firstly considering the left end piece 67, of which a section is shown in FIG. 8, said end piece 67 is provided with a through passage 91 and diametrically opposite thereto an aperture 93 opening to the slide valve 63 and on one hand being connected with an exterior container 85 having a variable volume and on the other hand through a transversely extending channel 97 being connected with an aperture 99 opening inwardly to the valve slide 63 and being angularly displaced 90° relative to the passage 91 and the aperture 93.

The right end piece 69, a section of which is shown in FIG. 9, is provided with three through passages 101, 103, 105, aligned with the aperture 93, the aperture 99 and the passage 91 of the left end piece 67, respectively.

Advantageously, the device described above can be used in applications where it is desired to observe the flow of the medium through a conduit, circuit or the like and where the flowmeter with certain intervals is to be recalibrated in view of changes in the character of the flowing medium. In the embodiment shown in the drawings the invention is applied to a respirator whereby, by means of the present invention, it is possible continuously to observe the flow of respiration gas to and from a patient and thereby accurately to follow up the respiration characteristic.

The through passage 91 in the left end piece 67 is connected with the respiration paths of the patient by a conduit not shown, and the through passage 105 in the right end piece 69 is connected to a respirator, the through passage 103 in the end piece 69 being connected so as to supply expiration gas from the respirator, as is diagrammatically shown in FIGS. 4 and 5.

The piston pump 111 used for the calibration and operating in the same manner as described in connection with FIGS. 1 and 2, has its working end connected to the through passage 101 in the right end piece 69. A valve 117 is mounted in the connecting conduit 115 connecting the working end of the piston pump 111 and the passage 101, by which valve the connecting conduit 115 can be connected with the atmosphere. The container 95, for instance a rubber bladder, having a variable volume, is connected to the aperture 93 in the left end piece 67 at the opposite end of the device.

The function of the device will now be more closely explained in connection with its use in a respirator. Firstly considering FIG. 5, where the flowmeter 81 is positioned in measuring position, i.e. it is positioned in the respirating circuit between the respirator and the connection with the respiration paths of the patient. This position corresponds to FIGS. 10 and 11. In the position shown in FIG. 5 it is thus possible by means of the flowmeter continuously to register the respiration characteristic when the respirator is in operation. During exhalation the expiration gas flows through the passage 91, the flow measuring channel 73 containing the flowmeter 81, the passage 105 and to the respirator and is further transferred to the passage 103 of the end piece 69, the transfer channel 75, the aperture 99, and the transversely extending channel 97 to the calibrating side of the device, where the expiration gas fills up the container 95, the connecting channel 77 and the connecting conduit 115. The valve 117 is open in this case, so that the expiration gas can be discharged into the atmosphere. The calibraing side is thus continuously supplied with expiration gas of current interest, while the respiration characteristic is observed by means of the flowmeter 81.

Now assume that the flowmeter is to be recalibrated in view of changed composition of the respiration gas causing a changed ratio between flow rate and pressure drop in the flowmeter. To carry out such recalibration the valve slide is rotated over 180° to the calibrating position shown in FIG. 4. This rotation is carried out by means of a handle 64 attached to the valve slide 63. In the position shown in FIG. 4 connection between the respirator and the respiration passage of the patient is still maintained through the connecting channel 77 at the same time as the expiration gas can pass through the end channel 79 into the atmosphere. Valve 117 now being closed, the calibrating side forms a closed system including on the one side the piston pump 111 and on the other side the container 95, the flowmeter 81 being mounted between said elements. This closed system is completely filled with expiration gas of current interest and by actuating the piston pump 111 it is now possible to recalibrate the flowmeter 81 with the expiration gas in question as a working medium, such as is explained in detail in connection with FIGS. 1 and 2. After completed calibration the valve slide 63 is again rotated over 180° back to the position of FIG. 5 for continued recording of the course of respiration based on the recalibration, valve 117 of course being open.

The advantages of the device described are obvious. It is possible without interrupting the respiration to transfer the flowmeter 81 from measuring position in the respirator circuit to calibrating position, to recalibrate the flowmeter with the respiration gas of current interest, which can be carried out in a few seconds, and then to return the flowmeter to the measuring position. By having the device 61 rigidly secured to the respirator it is thus possible to carry out the procedure described above quickly and simply without disarranging the conduits and connections belonging to the respirator, which is of a great importance out of a clinical point of view.

It is also possible to use the device for spontaneous breathing, which is diagrammatically indicated in FIG. 5 by a connecting conduit 119 having a check valve 121 therein allowing the admission of air from outside at inhalation but preventing discharging of gas into the atmosphere at exhalation, the gas exhaled being transferred to the calibrating system. In this case the respirator is disconnected. In other respects the device functions in spontaneous breathing in the same manner as described above.

What is claimed is:

1. Device for a flowmeter adapted for detecting the flow of a medium in a measuring circuit, the flowmeter being arranged to be calibrated in a calibrating circuit with a calibrating medium having a known flow generated by a driving device, including means for shifting the flowmeter between a measuring position in the measuring circuit and a calibrating position in the calibrating circuit, conduits to transfer calibrating medium when the flowmeter is in measuring position, to the calibrating circuit for filling same with medium of current interest before the calibration, said flowmeter being contained in a valve slide of a slide valve which valve slide is adjustable to shift said flowmeter between a measuring position and a calibrating position, said slide valve comprises a valve housing containing the valve slide and in which the valve slide is cylindric and adjustable by rotation thereof in the valve housing, the valve slide having an axially extending flow measuring channel containing the flowmeter and being on the one side connected with the driving means when the flowmeter is in calibrating position and being on the other hand connected for the passage of the medium to be measured when the flowmeter is in measuring position, said valve slide having an axially extending through connecting channel traversible by medium when the flowmeter is in calibrating position and an axial through transfer channel for medium to pass to the calibrating circuit when the flowmeter is in measuring position.

2. Device according to claim 1, in which the flow measuring channel and the connecting channel are diametrically opposed to each other and are positioned at the same radial distance from the centre axis of the valve slide.

3. Device according to claim 2, in which the transfer channel is positioned angularly displaced 90° relative to said flow measuring and connecting channels and at the same radial distance from the centre axis of the valve slide as are said two channels, an end channel being provided at one end of the valve slide and being positioned diametrically opposed to the transfer channel, said end channel being arranged to conduct medium from the device when the flowmeter is in calibrating position.

4. Device according to claim 3, in which the valve housing has first and second end pieces, said first end piece having a through passage connectable with the flow measuring channel and with the connecting channel, respectively, and two apertures angularly displaced 90° relative to each other and displaced 90° and 180°, respectively, relative to said through passage, which apertures open inwardly to the valve slide and are connected to each other by means of a transversely extending channel which is connected with the atmosphere or a container, said second end piece having three through passages aligned with said two apertures and said through passage of said first end piece, respectively.

References Cited

UNITED STATES PATENTS

| | | | |
|---|---|---|---|
| 2,948,144 | 8/1960 | Applequist | 73—3 |
| 3,098,382 | 7/1963 | Hoffman et al. | 73—3 XR |
| 3,120,118 | 2/1964 | Boyle | 73—3 |
| 3,273,375 | 9/1966 | Howe | 73—3 |

FOREIGN PATENTS

| | | |
|---|---|---|
| 163,378 | 1964 | U.S.S.R. |
| 246,712 | 1963 | Australia. |

S. CLEMENT SWISHER, *Primary Examiner.*